(12) United States Patent
Wu et al.

(10) Patent No.: US 12,491,115 B1
(45) Date of Patent: Dec. 9, 2025

(54) GOGGLES STRUCTURE FOR EASY REPLACEMENT OF BREATHABLE SPONGE

(71) Applicant: Tsingtao OGK Co., Ltd., Shandong (CN)

(72) Inventors: Xianhao Wu, Shandong (CN); Yushan Guo, Shandong (CN); Hengzhi Jin, Shandong (CN)

(73) Assignee: Tsingtao OGK Co., Ltd., Qingdao (CN)

( * ) Notice: Subject to any disclaimer, the term of this patent is extended or adjusted under 35 U.S.C. 154(b) by 0 days.

(21) Appl. No.: 19/057,937

(22) Filed: Feb. 19, 2025

(30) Foreign Application Priority Data

Nov. 15, 2024 (CN) .......................... 202422798685.0

(51) Int. Cl.
*A61F 9/02* (2006.01)

(52) U.S. Cl.
CPC .............. *A61F 9/028* (2013.01); *A61F 9/026* (2013.01)

(58) Field of Classification Search
CPC .................................. A61F 9/028; A61F 9/02
USPC ............................................ 2/431, 452, 436
See application file for complete search history.

(56) References Cited

U.S. PATENT DOCUMENTS

| | | | | |
|---|---|---|---|---|
| 4,547,909 A * | 10/1985 | Bell | A61F 9/029 | 351/158 |
| 4,689,838 A * | 9/1987 | Angermann | A61F 9/025 | 2/441 |
| 4,726,074 A * | 2/1988 | Baclit | A42B 3/22 | 2/431 |
| 4,977,627 A * | 12/1990 | Metcalfe | A61F 9/028 | 2/447 |
| 5,689,834 A * | 11/1997 | Wilson | A61F 9/028 | 2/435 |
| 5,966,746 A * | 10/1999 | Reedy | A61F 9/028 | 2/436 |
| 6,062,688 A * | 5/2000 | Vinas | G02C 11/08 | 351/44 |
| 6,076,196 A * | 6/2000 | Masumoto | A61F 9/028 | 2/452 |
| 6,282,727 B1 * | 9/2001 | Lindahl | A61F 9/025 | 2/431 |
| 6,611,966 B1 * | 9/2003 | Yamamoto | A61F 9/028 | 2/436 |
| 6,665,885 B2 * | 12/2003 | Masumoto | A61F 9/028 | 2/441 |

(Continued)

*Primary Examiner* — Alissa L Hoey
*Assistant Examiner* — Akwokwo Olabisi Redhead
(74) *Attorney, Agent, or Firm* — JEEN IP LAW, LLC

(57) ABSTRACT

This application relates to the field of goggles, particularly to a goggles structure for easy replacement of breathable sponge, including a goggles body, a fixing strip that is detachably connected to the upper side of the goggles body, and a connection component set between the goggles body and the fixing strip to fix the position of the fixing strip on the goggles body. One side of the goggles body forms a protective space for enclosing the user's eyes, and a placement space for placing breathable sponges is formed between the fixing strip and the goggles body. The upper side of the goggles body is provided with a first breathable hole that connects the protective space and the placement space, and the fixing strip is provided with a second breathable hole that connects the placement space and the outside. This application has the effect of improving the convenience of replacing goggles.

8 Claims, 5 Drawing Sheets

(56) References Cited

U.S. PATENT DOCUMENTS

| | | | | |
|---|---|---|---|---|
| 6,732,382 B2 * | 5/2004 | Dondero | A61F 9/028 | 2/436 |
| 7,181,779 B2 * | 2/2007 | Hussey | A61F 9/027 | 2/431 |
| 7,594,280 B2 * | 9/2009 | Lindahl | G02C 9/00 | 2/431 |
| 2003/0033661 A1 * | 2/2003 | Huh | A61F 9/029 | 2/436 |
| 2005/0015862 A1 * | 1/2005 | Dondero | G08B 21/0453 | 2/436 |
| 2007/0113325 A1 * | 5/2007 | Curci | A61F 9/025 | 2/436 |
| 2008/0155736 A1 * | 7/2008 | Paulson | G02C 9/04 | 2/431 |
| 2008/0196149 A1 * | 8/2008 | Takeshi | A61F 9/027 | 2/451 |
| 2009/0188023 A1 * | 7/2009 | Hsu | A61F 9/026 | 2/442 |
| 2009/0222979 A1 * | 9/2009 | Wang | A61F 9/025 | 2/431 |
| 2009/0313746 A1 * | 12/2009 | Wang | A61F 9/025 | 2/431 |
| 2010/0024099 A1 * | 2/2010 | Nolan | A61F 9/028 | 2/436 |
| 2011/0225711 A1 * | 9/2011 | Reyes | A61F 9/025 | 2/431 |
| 2012/0222201 A1 * | 9/2012 | Dondero | A61F 9/029 | 2/439 |
| 2012/0324638 A1 * | 12/2012 | Tobia | A61F 9/026 | 351/83 |
| 2013/0019387 A1 * | 1/2013 | McNeal | A61F 9/028 | 2/436 |
| 2014/0033408 A1 * | 2/2014 | Currens | A61F 9/025 | 2/431 |
| 2014/0059747 A1 * | 3/2014 | Belbey | A61F 9/028 | 2/431 |
| 2014/0317836 A1 * | 10/2014 | McCulloch | A61F 9/029 | 2/435 |
| 2015/0074880 A1 * | 3/2015 | Blanchard | G02C 5/008 | 2/431 |
| 2015/0374550 A1 * | 12/2015 | Saylor | A61F 9/028 | 2/436 |

* cited by examiner

GOGGLES STRUCTURE FOR EASY REPLACEMENT OF BREATHABLE SPONGE

CROSS-REFERENCE TO RELATED APPLICATION

This application claims priority of Chinese Patent Application No. 202422798685.0, filed on Nov. 15, 2024, the entire contents of which are incorporated herein by reference.

TECHNICAL FIELD

This application relates to the technical field of goggles, in particular to a goggles structure for easy replacement of breathable sponge.

BACKGROUND

As an important personal protective equipment, goggles are widely used in various occasions such as medical treatment, industry, laboratory, and outdoor sports. In order to ensure the comfort and safety of the wearer, the design of goggles is constantly improving, especially in terms of breathability.

At present, most of the common goggles on the market improve the breathability of wearing by setting a first air vent on the upper side of the frame, and a breathable sponge is installed in the first air vent to prevent fogging and maintain clear vision.

When using goggles, it is necessary to frequently replace the breathable sponge, but now the breathable sponge is often directly attached or embedded in the frame. When replacing the breathable sponge, tools or a lot of effort are needed to disassemble and reinstall it, making replacement very inconvenient.

SUMMARY

In order to improve the convenience of replacing goggles, this application provides a goggles structure for easy replacement of breathable sponge.

The goggles structure for easy replacement of breathable sponge provided in this application adopts the following technical solution:

A goggles structure for easy replacement of breathable sponge, including a goggles body, a fixing strip detachably connected to the upper side of the goggles body, and a connection component set between the goggles body and the fixing strip for fixing a position of the fixing strip on the goggles body, wherein one side of the goggles body forms a protective space for enclosing eyes of user, and a placement space for placing breathable sponge is formed between the fixing strip and the goggles body; the upper side of the goggles body is provided with a first breathable hole that connects the protective space and the placement space, and the fixing strip is provided with a second breathable hole (44) that connects the placement space and the outside.

By adopting the above technical solution, the placement space formed between the fixing strip and the goggles body facilitates the placement of the breathable sponge. At the same time, the first breathable hole on the goggles body and the second breathable hole on the fixing strip improve the breathability of the goggles, effectively preventing fogging and ensuring clear vision for the wearer. The setting of the fixing strip and the connection component realizes the detachable connection of the fixing strip, making it easy to replace the breathable sponge between the fixing strip and the goggles body, greatly providing convenience for replacing breathable sponges.

Optionally, a limit slot is provided on the goggles body for embedding the fixing strip. The connection component includes a snap block fixedly connected to one side of the fixing strip, one side of the limit slot is provided with a snap slot for inserting snap block, and an avoidance slot connected to the bottom of the snap slot is provided at one side of the snap slot.

By adopting the above technical solution, when using, directly install the fixing strip in the limit slot and slide the snap block into the snap slot. Then operate the fixing strip to slide in the limit slot, so that the snap block can slide into the avoidance slot, thereby fixing the position of the fixing strip in the goggles body.

Optionally, the connection component includes a first magnet fixedly connected to the goggles body and a second magnet fixedly connected to the fixing strip, and the first magnet and the second magnet mutually attract and adsorb to each other.

By adopting the above technical solution, the position of the fixing strip on the goggles body can be fixed by the adsorption of the first magnet and the second magnet. The fixing strip can be slid away from the goggles body by applying force, when the applied force overcomes the magnetic force of the first magnet and the second magnet, the fitting relationship between the fixing strip and the goggles body can be released, simplifying the installation and disassembly process of the fixing strip and improving the convenience of replacing the breathable sponge.

Optionally, the goggles body is provided with a limit slot for embedding the fixing strip, and the goggles body is provided with an ejection component being capable of ejecting the fixing strip from the limit slot.

By adopting the above technical solution, the limit slot provided on the goggles body can accommodate the fixing strip, allowing the fixing strip to be stably positioned on the upper side of the goggles during installation. At the same time, the ejection component is capable of ejecting the fixing strip from the limit slot, thereby achieving rapid disassembly of the fixing strip.

Optionally, the shape of the cross-section of the limit slot is a trapezoid, and a circumference of the limit slot gradually increases from the side away from the protective space to the side closer to the protective space; and the shape of the cross-section of the fixing strip facing the placement space is a trapezoid that matches the shape of the limit slot.

By adopting the above technical solution, it is beneficial for the quick and accurate installation and disassembly of the fixing strip.

Optionally, the goggles body is provided with an installation slot, and the ejection component includes a push rod slidably connected inside the installation slot and a rocker plate rotatably connected to the goggles body, the middle of the rocker plate is hinged to the goggles body, one end of the rocker plate is located in the limit slot, and the other end of the rocker plate is located in the installation slot and between the push rod and the bottom of the installation slot. When the push rod slides in the installation slot, the push rod pushes the rocker plate to rotate around a hinge shaft with the goggles body.

By adopting the above technical solution, the push rod slidably connected inside the installation slot on the goggles body, as well as the rocker plate rotatably connected to the goggles body, can achieve a structure where one end of the rocker plate is located in the limit slot and in contact with the fixing strip, and the other end is located in the installation slot and between the push rod and the bottom of the installation slot, with the rocker plate hinged to the goggles body in the middle of the rocker plate. This allows the push rod to slide in the installation slot and push the rocker plate to rotate around the hinge shaft with the goggles body, thereby smoothly pushing out the fixing strip from the limit slot, facilitating and quickly completing the disassembly process of the fixing strip, and achieving the goal of quickly replacing the breathable sponge.

Optionally, the end of the push rod is fixedly connected with a contact ball, and the rocker plate is provided with a driving slot for the contact ball to be embedded and slid.

By adopting the above technical solution, the contact ball fixed at the end of the push rod can be embedded and slid in the driving slot opened on the rocker plate, so that when the push rod slides in the installation slot, it can effectively push the rocker plate to rotate around the hinge shaft with the goggles body, thereby achieving smooth ejection of the fixing strip. On the basis of ensuring synchronous movement of the push rod and the rocker plate, it also avoids the phenomenon of jamming.

Optionally, a reset spring is fixedly connected between the bottom of the installation slot and the rocker plate.

By adopting the above technical solution, the reset spring can automatically reset after the push rod pushes the rocker plate to rotate, allowing the rocker plate to quickly return to its original position.

Optionally, a limit block is fixedly connected to the side wall of the push rod, and a sliding slot is opened on the inner wall of the installation slot for the limit block to be embedded and slid.

By adopting the above technical solution, the push rod slides more stably in the installation slot, avoiding displacement or jamming of the push rod during the sliding process, and improving the operation reliability of the ejection component.

Optionally, there are two of the ejection components, and the two ejection components are respectively located at both ends of the fixing strip.

By adopting the above technical solution, the setting of two ejection components makes it easier for the fixing strip to be ejected from the limit slot, further improving the convenience of replacing the breathable sponge.

In summary, this application contains at least one advantageous technical effect as follows:
1. By setting the fixing strip and the connection component in detachable manner, it is convenient for users to quickly replace breathable sponges, which improves the convenience of using goggles;
2. The placement space formed between the fixing strip and the goggles body can stably place the breathable sponge, effectively improving the breathability performance during wearing and preventing the occurrence of fogging phenomenon;
3. The connection components are fixed by magnets, making the connection between the fixing strip and the goggles body more stable and easy to disassemble.

Figure 1:
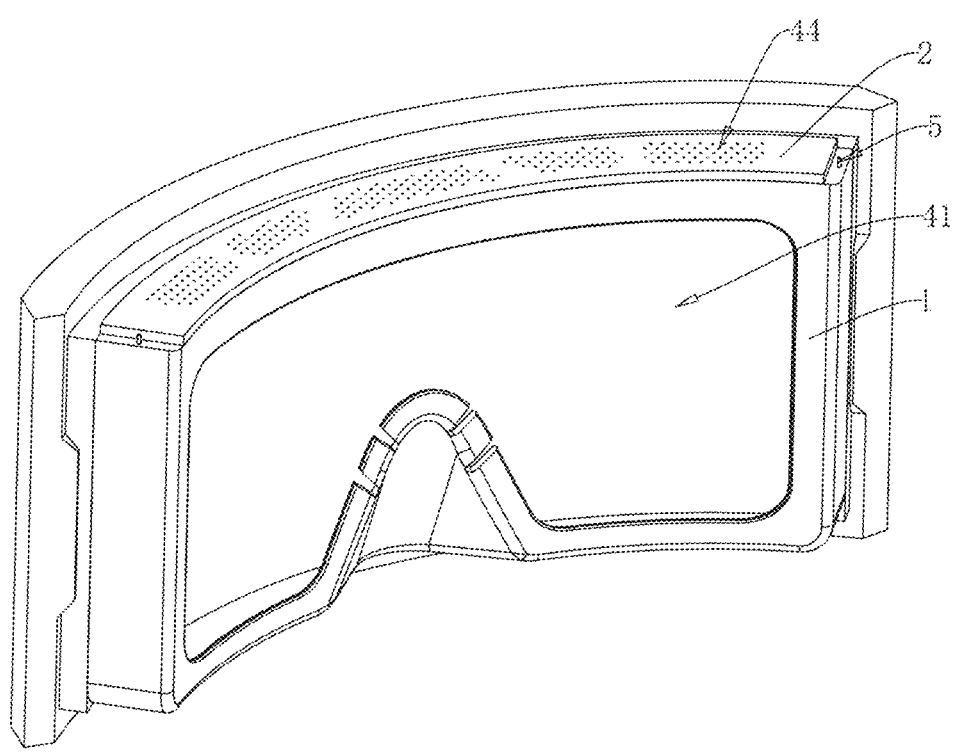
FIG. 1 is a schematic diagram of the overall structure of the present application.

Reference marks in the drawings: 1. goggles body; 11. limit slot; 12. installation slot; 13. snap slot; 14. avoidance groove; 2. fixing strip; 3. connection component; 31. first magnet; 32. second magnet; 33. snap block; 41. protective space; 42. placement space; 43. first breathable hole; 44. second breathable hole; 5. ejection component; 51. push rod; 511. contact ball; 512, limit block; 52. rocker plate; 521. driving slot; 522, sliding slot; 53. reset spring.

DETAILED DESCRIPTION OF THE EMBODIMENTS

Further detailed illustration of the present application will be provided in conjunction with FIGS. 1-5.

Figure 2:
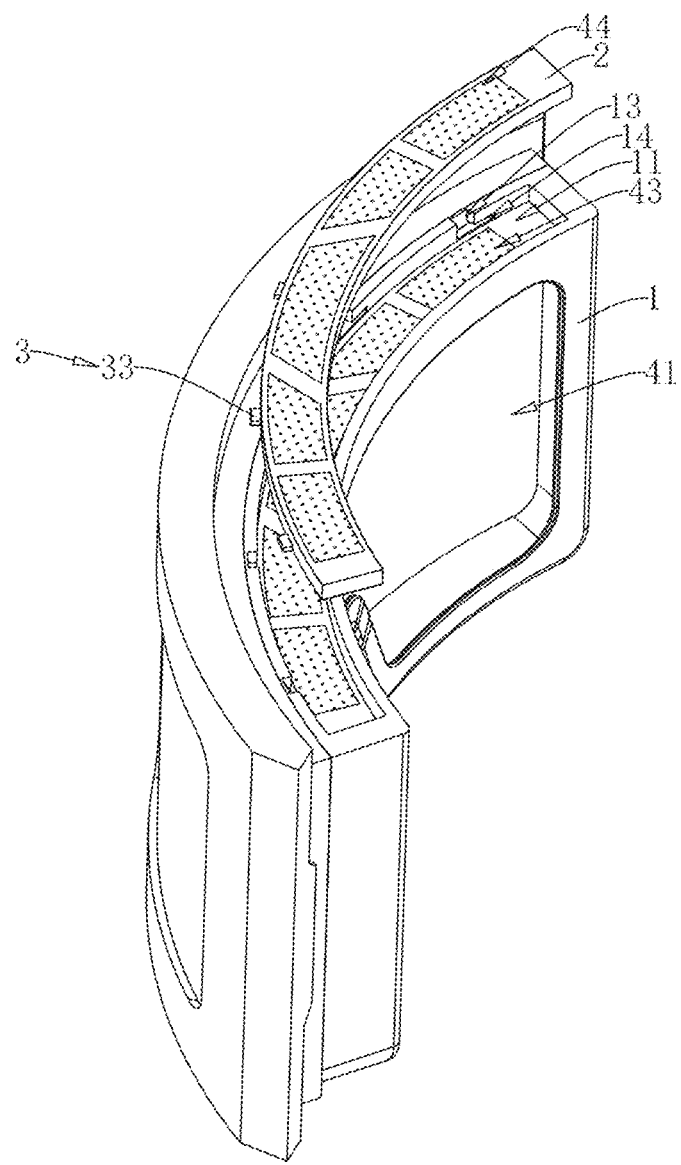
FIG. 2 is a schematic diagram of the structure of the connection component in one embodiment.

The present embodiment discloses a goggles structure for easy replacement of breathable sponge. Referring to FIG. 1 and FIG. 2, the structure of the goggles for easy replacement of the breathable sponge includes a goggles body 1, a fixing strip 2 detachably connected to the upper side of the goggles body 1, and a connection component 3 set between the goggles body 1 and the fixing strip 2 for fixing the position of the fixing strip 2 on the goggles body 1. One side of the goggles body 1 forms a protective space 41 for enclosing the user's eyes, and a placement space 42 for placing a breathable sponge is formed between the fixing strip 2 and the goggles body 1. The upper side of the goggles body 1 is provided with a first breathable hole 43 that connects the protective space 41 and the placement space 42, and the fixing strip 2 is provided with a second breathable hole 44 that connects the placement space 42 with the outside. When in use, place the breathable sponge directly in the placement space 42 and fix the fixing strip 2 to the goggles body 1 through the connection component 3. When the wearer wears the goggles, the external gas can reach the placement space 42 through the second breathable hole 44 and reach the protective space 41 through the first breathable hole 43, achieving consistent temperature inside and outside and reducing the occurrence of mist on the goggles. When it is necessary to replace the breathable sponge, the fitting relationship between the fixing strip 2 and the goggles body 1 can be directly released, and then the breathable sponge can be removed from the placement space 42 and replaced with a new one, achieving the effect of facilitating the replacement of the breathable sponge. It effectively solves the inconvenience of replacing the breathable sponge in goggles, and improves the user experience.

The shape of the first breathable hole 43 can be circular, elliptical, or rectangular, with a diameter typically between 2 and 5 millimeters. The number of first breathable holes 43 can be adjusted according to the actual situation, which can be distributed throughout the entire length of the upper side of the goggles body 1 or concentrated in a certain area. The function of the first breathable hole 43 is to allow the air inside the protective space 41 to circulate with the air inside the placement space 42, effectively reducing the internal humidity and minimizing the occurrence of mist.

The second breathable hole 44 is set on the fixing strip 2, usually in the form of a slender strip or mesh structure, with a size of about 1 to 3 millimeters, and the number depends on the needs.

A limit slot 11 is provided on the goggles body 1 for embedding the fixing strip 2.

Referring to FIG. 2, in one another of the present application, the connection component 3 includes a snap block 33 fixedly connected to one side of the fixing strip 2, and multiple snap blocks 33 are spaced along the length direction of the fixing strip 2. At the same time, a snap slot 13 for inserting the snap block is provided on the inner wall of the limit slot 11, and an avoidance slot 14 connected to the bottom of the snap slot 13 is provided at one side of the snap slot 13. When installing, directly install the fixing strip 2 in the limit slot 11 and slide the snap block 33 into the snap slot 13. Then operate the fixing strip 2 to slide in the limit slot 11, so that the snap block 33 can slide into the avoidance slot 14, thereby fixing the position of the fixing strip 2 in the goggles body 1.

Figure 3:
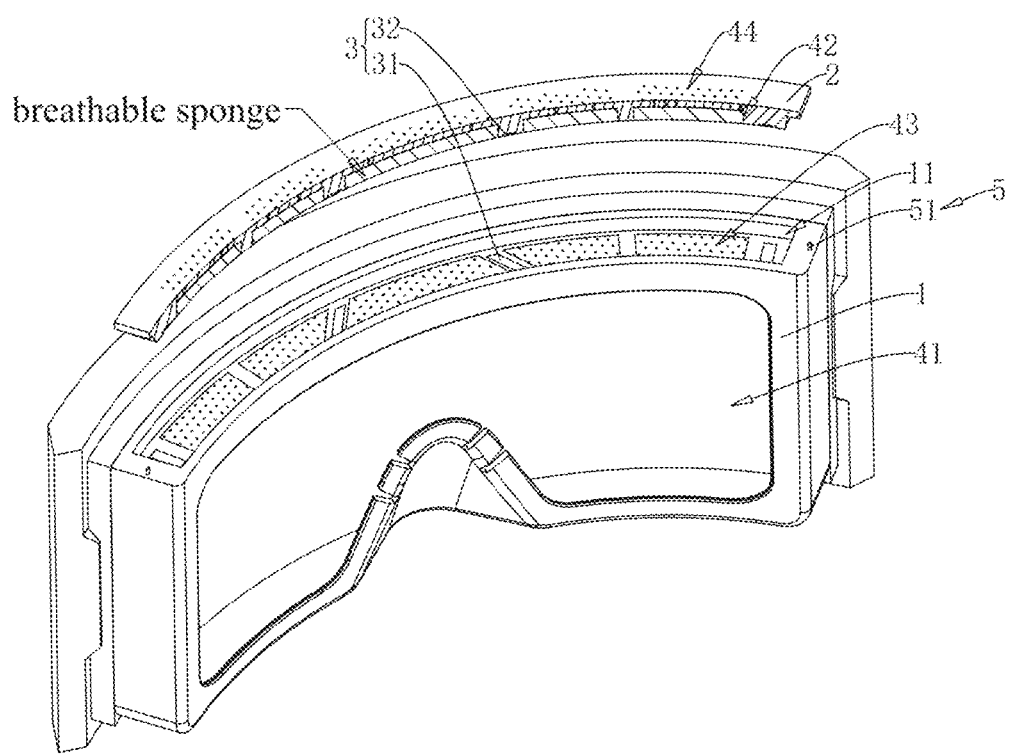
FIG. 3 is a schematic diagram of the structure of the connection component in another embodiment.

Referring to FIG. 1 and FIG. 3, in another embodiment of the present application, the connection component 3 is a magnetic attraction component, which includes a first magnet 31 and a second magnet 32. Specifically, the first magnet 31 is fixed to the goggles body 1, and the second magnet 32 is fixed to the fixing strip 2. The first magnet 31 and the second magnet 32 are connected through magnetic attraction. This connection method is simple, sturdy, and easy to operate.

Wherein, a plurality of the first magnets 31 can be spaced along the length direction of the goggles body 1, for example, set one every 30 mm, which can increase the stability of the fixing strip 2 and reduce the possibility of loosening. A plurality of the second magnets 32 are also spaced along the length direction of the fixing strip 2, and the plurality of the second magnets 32 are arranged in one-to-one correspondence with the plurality of the first magnets 31 to ensure that the entire fixing strip 2 can be tightly adhered to the goggles body 1.

Referring to FIG. 3, the goggles body 1 is equipped with an ejection component 5 that can eject the fixing strip 2 from the limit slot 11. Under normal circumstances, the fixing strip 2 is fixed in the limit slot 11 through the connection component 3. When it is necessary to replace the breathable sponge, the fixing strip 2 can be directly pushed out of the limit slot 11 through the ejection component 5 to replace the breathable sponge in the placement space 42. This not only fixes the position of the fixing strip 2, but also facilitates the disassembly of the fixing strip 2 from the limit slot 11.

Wherein, the limit slot 11 can be designed with a trapezoidal cross-section, and the circumference of the limit slot 11 gradually increases from the side away from the protective space 41 to the side closer to the protective space 41. The cross-section of the fixing strip 2 facing the placement space 42 is a trapezoid that matches the shape of the cross-section of the limit slot 11. When the fixing strip 2 is installed on the limit slot 11, it can be smoothly inserted into the limit slot 11, and the more the fixing strip 2 is inserted, the tighter the fixing of the fixing strip 2.

Figure 4:
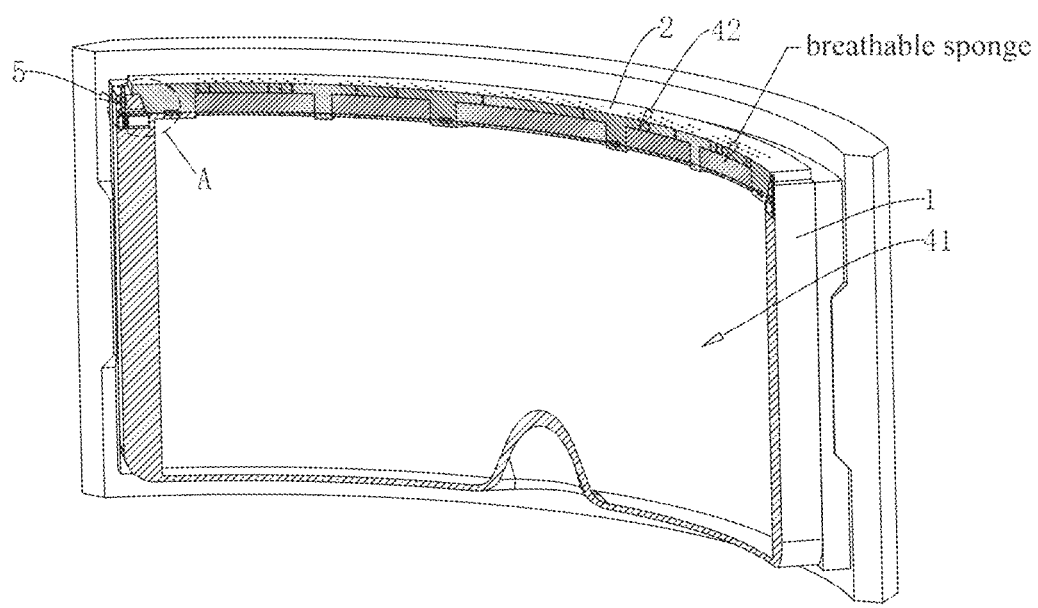
FIG. 4 is a sectional schematic diagram taken to illustrate the connection relationship between the fixing strip and the goggles body.
Figure 5:
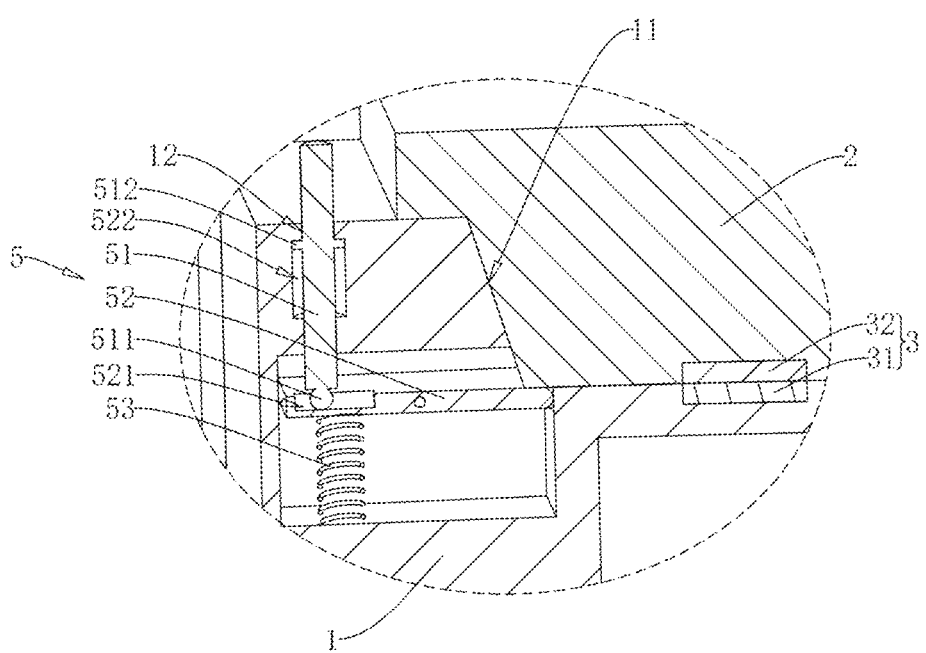
FIG. 5 is an enlarged partial view of part A in FIG. 4.

Referring to FIG. 4 and FIG. 5, an installation slot 12 is provided on goggles body 1. The ejection component 5 includes a push rod 51 slidably connected to the installation slot 12, and a rocker plate 52 rotatably connected to the inside of the goggles body 1. The middle of the rocker plate 52 is hinged to the goggles body 1, with one end of the rocker plate 52 located in the limit slot 11 and the other end located in the installation slot 12. One end of the rocker plate 52 located in the installation slot 12 is located between the bottom of the installation slot 12 and the push rod 51. When the user presses the push rod 51 externally, the push rod 51 can come into contact with the rocker plate 52 and drive the rocker plate 52 to rotate around the hinge shaft with the goggles body 1, and the rocker plate 52 located at one end of the limit slot 11 rotates towards the opening direction of the limit slot 11, thereby pushing out the fixing strip 2 located inside the limit slot 11.

Wherein, a reset spring 53 is also fixedly connected between the bottom of the installation slot 12 and the rocker plate 52. When the user presses the push rod 51 from the outside, the reset spring 53 is compressed; when the force applied to the push rod 51 is released, the rocker plate 52 is reset under the elastic action of the reset spring 53.

Wherein, the push rod 51 is slidably connected to the rocker plate 52, so that when the push rod 51 drives the rocker plate 52 to rotate, the push rod 51 can always be in contact with the rocker plate 52, and the rocker plate 52 can rotate in an arc shape. Specifically, a contact ball 511 is fixedly connected to the push rod 51, and a driving slot 521 larger than a semicircle is provided on the rocker 52 for inserting the contact ball 511. The contact ball 511 is located inside the driving slot 521. On the basis of enabling the push rod 51 to synchronously move the rocker plate 52 through the contact ball 511, the push rod 51 can also slide relative to the rocker plate 52 to avoid jamming.

At the same time, in order to limit the sliding distance of the push rod 51, limit blocks 512 are fixed on the opposite side walls of the push rod 51. At the same time, a sliding slot 522 is opened on the inner wall of the installation slot 12 for the limit block 512 to be inserted and slid. When the push rod 51 slides in the installation slot 12, the limit block 512 also slides in the sliding slot 522, thereby limiting the limit position of the sliding of the push rod 51.

Wherein, there can be two ejection components 5, which are located at both ends of the fixing strip 2 respectively, so that the two ejection components 5 can simultaneously eject the two ends of the fixing strip 2, making the disassembly of the fixing strip 2 more convenient and smooth.

The implementation principle of the goggles structure for easy replacement of breathable sponge in this application is as follows: under normal conditions, the fixing strip 2 is embedded in the limit slot 11, and the position of the fixing strip 2 in the limit slot 11 is fixed by the attraction of the first magnet 31 and the second magnet 32, while the breathable sponge is clamped between the fixing strip 2 and the goggles body 1. When it is necessary to replace the breathable sponge, the user can directly press the push rod 51 to drive the rocker plate 52 to rotate, then the end of the rocker plate 52 located in the limit slot 11 will slide towards the opening of the limit slot 11, so that the rocker plate 52 can push the fixing strip 2 out of the limit slot 11, achieving the disassembly of the fixing strip 2. Then the user can directly disassemble and replace the breathable sponge located between the fixing strip 2 and the goggles body. After the replacement is completed, the fixing strip 2 is placed in the limit slot 11, and the position of the fixing strip 2 in the limit slot 11 is fixed by the attraction of the first magnet 31 and the second magnet 32 to complete the replacement of the breathable sponge, which is more conveniently and quickly.

The above are the preferred embodiments of the present application and do not limit the scope of the present application. Therefore, any equivalent changes made according to the structure, shape, and principle of the present application should be included in the scope of the present application.

What is claimed is:

1. A goggles structure for easy replacement of breathable sponge, comprising a goggles body, a fixing strip detachably connected to an upper side of the goggles body, and a connection component set between the goggles body and the fixing strip for fixing a position of the fixing strip on the goggles body, wherein one side of the goggles body forms a protective space for enclosing eyes of user, and a placement space for placing breathable sponge is formed between the fixing strip and the goggles body; the upper side of the goggles body is provided with a first breathable hole that connects the protective space and the placement space, and the fixing strip is provided with a second breathable hole that connects the placement space and an outside; the goggles body is provided with a limit slot for embedding the fixing strip, and the goggles body is provided with an ejection component being capable of ejecting the fixing strip from the limit slot; a shape of a cross-section of the limit slot is a trapezoid, and a circumference of the limit slot gradually increases from a side away from the protective space to a side closer to the protective space; and a shape of a cross-section of the fixing strip facing the placement space is a trapezoid that matches the shape of the limit slot.

2. The goggles structure for easy replacement of breathable sponge according to claim 1, wherein the goggles body is provided with a limit slot for embedding the fixing strip; the connection component comprises a snap block fixedly connected to one side of the fixing strip, one side of the limit slot is provided with a snap slot for inserting the snap block, and an avoidance slot connected to a bottom of the snap slot is provided at one side of the snap slot.

3. The goggles structure for easy replacement of breathable sponge according to claim 1, wherein the connection component comprises a first magnet fixedly connected to the goggles body and a second magnet fixedly connected to the fixing strip, and the first magnet and the second magnet mutually attract and adsorb to each other.

4. The goggles structure for easy replacement of breathable sponge according to claim 1, wherein the goggles body is provided with an installation slot, and the ejection component comprises a push rod slidably connected inside the installation slot and a rocker plate rotatably connected to the goggles body, a middle of the rocker plate is hinged to the goggles body, one end of the rocker plate is located in the limit slot, and an other end of the rocker plate is located in the installation slot and between the push rod and a bottom of the installation slot; when the push rod slides in the installation slot, the push rod pushes the rocker plate to rotate around a hinge shaft with the goggles body.

5. The goggles structure for easy replacement of breathable sponge according to claim 4, wherein an end of the push rod is fixedly connected with a contact ball, and the rocker plate is provided with a driving slot for the contact ball to be embedded and slid.

6. The goggles structure for easy replacement of breathable sponge according to claim 4, wherein a reset spring is fixedly connected between the bottom of the installation slot and the rocker plate.

7. The goggles structure for easy replacement of breathable sponge according to claim 4, wherein a limit block is fixedly connected to a side wall of the push rod, and a sliding slot is opened on an inner wall of the installation slot for the limit block to be embedded and slid.

8. The goggles structure for easy replacement of breathable sponge according to claim 1, wherein there are two of the ejection components, and the two ejection components are respectively located at both ends of the fixing strip.

\* \* \* \* \*